Patented Dec. 3, 1935

2,023,252

UNITED STATES PATENT OFFICE 2,023,252

RUBBER AND RUBBERIZED SANITARY GARMENT

Jacob Stein, Brooklyn, and Hugh H. Mosher, New York, N. Y.; said Mosher assignor to said Stein No Drawing. Application February 2, 1932, Serial No. 590,524

1 Claim. (Cl. 106—23)

The present invention relates to rubber or rubberized garments or like articles such as apparel, shoes, bed sheets, and numerous other commodities, and broadly has for its object the provision of such rubber articles having improved properties of neutralizing body acids and adsorbing injurious or objectionable ingredients of body excretions which come in contact therewith, and is an improvement of the compound disclosed in the co-pending application Ser. No. 529,304, of Jacob Stein.

Perspiration normally contains varying amounts of acids, phosphates, chlorides, certain gaseous compounds of which hydrogen sulphide and carbon dioxide are representatives, and end products of protein metabolism such as ureates. Of these, the acids, gaseous components and excretory derivatives are objectionable from a sanitary standpoint.

Thus when sheet rubber, which is impervious to air and water, is worn next or adjacent the human body, particularly in the form of garments such as baby pants, bloomers, women's sanitary articles, reducing girdles or corsets, etc., it shuts off the circulation of air, or materially so, and thereby causes more than normal perspiration and excretion in this area. This perspiration, together with other emissions of the body, attacks the tissue of the skin, as well as the material of the garment, resulting in irritations of various kinds to the skin and a destructive action on the garment. This action is more pronounced when acids from urine are present in conjunction with ordinary acids emitted from the body through the pores, all resulting in a very uncomfortable, unhealthy and unsanitary condition.

One of the objects of the present invention is to eliminate, or reduce, this condition and avoid injury or discomfort to the body as well as to prolong the life of the rubber garment.

Another object of the invention is the provision of a rubber or rubberized garment possessing the property of effectively neutralizing acids and of adsorbing the end products of human protein metabolism.

The objects of the present invention are broadly accomplished by combining a soluble base ingredient with any desired rubber compound or mix, said ingredient being soluble in the liquids discharged from the body, such as perspiration, urine and the like, to neutralize the acids therein and reduce or eliminate the resultant odors therefrom; and, in further, combining with the rubber compound or mix, other ingredients which will adsorb the gaseous or end products. It is preferred to add these ingredients to the rubber compound or mix while they are in a dry or substantially dry state as distinguished from a liquid state.

These ingredients are employed in such proportions and amount as to best accomplish the above results for the uses to which the particular article or garment, employing the compound, is put, and in such a manner that said ingredients will leach out of the garment to neutralize the acids when the body emissions come in contact with or in proximity to, the surface of said garment.

The present invention accordingly may be practiced, for example, by adding to any suitable rubber mix by weight, the following ingredients:

| Ingredient | Amount |
|---|---|
| Colloidal silica | ½ of 1 percent to 15 percent |
| Sodium silicate | ½ of 1 percent to 10 percent |
| Borax | ½ of 1 percent to 10 percent |
| Sodium benzoate | ½ of 1 percent to 10 percent |
| Sodium carbonate | ½ of 1 percent to 10 percent |

The rubber mix may include coagulated latex, gutta percha, balata or any other equivalent coagulated saps or juices obtained from plants or the like; any suitable catalyst or accelerator if desired; sulphur; and a filler, if desired. The catalyst or accelerator may be of any accepted material, such as tetramethylthicurea disulphide, diphenylguanidine or paranitrosodimethylamine, analine, mercaptobenzothrazole reaction product of diphenylguanidine; and the filler may be of any suitable material such, for instance, as talc, china clay, finely divided silica, and mixtures of various fillers to give special properties.

In the specific example of our invention given above, we may substitute other soluble weak bases in place of borax and sodium carbonate, such as (1) di-sodium phosphate, (2) tri-sodium phosphate, or (3) sodium acetate.

While the ingredients may be satisfactorily employed within the range of percentages given above, it is found that desirable results are obtained by adding quantities of the above ingredients to the rubber compound in proportions approximately three percent by weight.

The quantity of the respective ingredients used in any particular compound may be varied in accordance with the conditions or uses under which the article or garment employing the rubber compound is used, so as to present a weaker or stronger neutralizing or adsorbing action. For instance, in abdominal reducing garments or corsets, a greater amount of one or all of the ingredients may be used than in dress shields or sanitary aprons. This will be left to the discretion of the manufacturer or the demands of the public, but in all events the amount of the ingredients will be such as will not cause any violent reaction toward the tissue of the body, as well as taking into consideration the reactions and dilutions caused by the influence of other ingredients in the rubber compound.

The rubber compound containing the above ingredients is particularly useful in women's and children's sanitary goods, corsets, reducing garments or bands, bathing shoes, bathing caps, baby pants, crib sheets, rubber hospital sheets and other garments which come in contact with or impinge against the body or the body excretions and which are made by the usual methods well known in the art.

In order to obtain a thorough mixture and dispersion of the above ingredients in the rubber compound, it is preferred to add them before or at the time the rubber compound is milled. After milling the rubber compound containing the above ingredients may be manipulated or calendered in the same manner as ordinary rubber mixtures. However, the ingredients give the rubber a softer texture which is velvety in finish; enhance the color of the rubber by making the color more vivid or brilliant; increase the life of the rubber due to the defensive action of the ingredients against the deteriorating elements contained in the body emissions. Also, the ability of the rubber to neutralize acid is an aid in protecting cellulose matter, compounded or calendered with the rubber, against rot due to body acidity. The rubber compound having the above ingredients may be cured in the ordinary manner.

Applicants have made the surprising discovery contrary to what one skilled in this art would expect, that the rubber or rubberized material made in accordance with applicants' invention has a longer life when employed in garments to be worn next or adjacent the body, than similar garments made up from prior art compositions. It would be expected by those skilled in the rubber art that ordinary rubber articles of commerce, made up from rubber containing a soluble ingredient, would have a shorter life than rubber articles made up without such soluble ingredients.

It has been found that the rubber compound made in accordance with the present invention and containing 5 percent sodium carbonate, 2 percent colloidal silica, 2 percent sodium silicate, 3 percent borax and 3 percent sodium benzoate, neutralizes or adsorbs approximately 1.13 percent of its weight of acid, adsorbs 18 mg. of sodium ureate, 8 mg. of carbon dioxide and 4 mg. of hydrogen sulphide per 50 gms. of rubber, under conditions approximating actual use. Varying the percentages of the above stated ingredients in the compound, the action will vary proportionately.

While the rubber compound disclosed in this specification has been described particularly in connection with rubber or rubberized garments, wearing apparel or the like, it is susceptible to any use where it is desired to neutralize acid and adsorb body excretions produced in the neighborhood of the material or article made of the rubber compound. Consequently, it is to be understood that the invention is susceptible to various changes as noted herein above and which fall within the scope of the appended claim.

Having thus described the invention, what is claimed as new is:

Rubber sheeting for making garments to be worn against body emissions and rendered impenetrable to air, water, or moisture by the density of the rubber—characterized by the presence of a basic ingredient thoroughly mixed and dispersed throughout the rubber in a quantity sufficient to neutralize any acid contained in the body emissions in use, and of such a character as to be non-injurious to body tissues, the basic ingredient being selected from the group of compounds consisting of sodium benzoate, sodium silicate, di-sodium phosphate, tri-sodium phosphate, and sodium acetate.

JACOB STEIN.
HUGH H. MOSHER.